(12) United States Patent
Park

(10) Patent No.: US 11,596,864 B2
(45) Date of Patent: Mar. 7, 2023

(54) METHOD, APPARATUS AND COMPUTER PROGRAM FOR IDENTIFYING INTENTION OF USER IN GAME

(71) Applicant: NEXON KOREA CORPORATION, Seongnam-si (KR)

(72) Inventor: Jeong Heum Park, Asan-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 57 days.

(21) Appl. No.: 16/793,300

(22) Filed: Feb. 18, 2020

(65) Prior Publication Data
US 2020/0261801 A1 Aug. 20, 2020

(30) Foreign Application Priority Data

Feb. 15, 2019 (KR) .................. 10-2019-0018149

(51) Int. Cl.
*A63F 13/5375* (2014.01)
*A63F 13/67* (2014.01)
*A63F 13/843* (2014.01)

(52) U.S. Cl.
CPC .......... *A63F 13/5375* (2014.09); *A63F 13/67* (2014.09); *A63F 13/843* (2014.09)

(58) Field of Classification Search
CPC ..... A63F 13/5375; A63F 13/67; A63F 13/843
USPC .......................................................... 463/11
See application file for complete search history.

(56) References Cited

U.S. PATENT DOCUMENTS

| | | | | |
|---|---|---|---|---|
| 2014/0342791 A1* | 11/2014 | Hugh | ................ | A63F 13/80 463/9 |
| 2014/0370984 A1 | 12/2014 | Beppu | | |
| 2015/0231501 A1* | 8/2015 | Antimary | ............. | A63F 13/822 463/31 |
| 2015/0321088 A1* | 11/2015 | Knutsson | ............. | G06F 3/0486 463/31 |
| 2015/0328538 A1* | 11/2015 | Oyama | ................ | A63F 9/0612 463/9 |
| 2016/0151703 A1* | 6/2016 | Lee | ...................... | A63F 13/426 463/9 |
| 2017/0197147 A1* | 7/2017 | Kurebayashi | .......... | A63F 13/63 |

\* cited by examiner

FOREIGN PATENT DOCUMENTS

| | | |
|---|---|---|
| JP | 2016-209532 A | 12/2016 |
| JP | 2018-149413 A | 9/2018 |
| KR | 2015-0138414 A | 12/2015 |

OTHER PUBLICATIONS

Dong-Jin. J., "Nexon soft launch of a puzzle game 'Runway Story'", Toyo Economy, retrieved from http//www.sateconomy.co.kr/news/articlePrint.html?idxno=50463, Sep. 12, 2018, 2 pages.

*Primary Examiner* — Allen Chan
(74) *Attorney, Agent, or Firm* — Kilpatrick Townsend & Stockton LLP

(57) ABSTRACT

According to an aspect of the disclosure, a game providing method is provided. The game providing method includes: displaying a game interface comprising a plurality of blocks; detecting a first interaction on a first block among the plurality of blocks; specifying the first block as a trigger block in response to the first block; detecting a second interaction on a second block adjacent to the first block; and performing, based on characteristic of the second interaction, either one of switching positions between the first block and the second block, and specifying the second block as the trigger block.

17 Claims, 11 Drawing Sheets

METHOD, APPARATUS AND COMPUTER PROGRAM FOR IDENTIFYING INTENTION OF USER IN GAME

CROSS-REFERENCE TO RELATED APPLICATION(S)

This application is based on and claims priority under 35 U.S.C. § 119(a) of Korean patent application number 10-2019-0018149 filed on Feb. 15, 2019 in the Korea Intellectual Property Office, the disclosure of which is incorporated by reference herein in its entirety.

BACKGROUND

1. Field

The disclosure relates to a method, an apparatus, and computer program for identifying an intention of a user in a puzzle game, in particularly, relates to identifying the intention of the user from a user interaction.

2. Description of Related Art

As technologies of devices and networks develops, a game provider provides games to users through various type of devices, and different needs of users are diversified.

A puzzle is a game genre which been loved by many users because its simplicity of game rules and short play time. A puzzle game may be implemented to be played intuitively by a user without reading a manual of the puzzle game.

However, an intention of a user may not be interpreted appropriately in the game due to the simplicity of an interaction method.

A prompt may be popped up to confirm an intention of a user, but frequent prompts may slow down or interrupt a progress of a game. Usually a prompt to confirm an intention of a user is popped up at an important crossroad, and it may be desirable that a result is output instantly without the prompt in response to a user input.

A match-three game is played by switching positions between a block and its adjacent block. For example, the positions between the two blocks may be changed in response to tapping the block first and then tapping the adjacent block. After a block is selected first, the selected block may be unselected by tapping the selected block or tapping a space where no block exists. After a block is selected first, another block may be selected by tapping a space where no block exists and then tapping the other block to switch positions between the other block and its adjacent block. After a block is selected first, a user may tap another block to select the other block without tapping a space where no block exists. However, if the other block is adjacent to the firstly selected block, positions of the selected block and the other block are switched, which is against the user's intention to select the other block to switch positions between the other block and its adjacent block.

Forcing a user, who intends to select the other block, to tap a space where no block exists may slow down a pace of a game and irritate the user because the user is forced to tap at least twice to select the other block to switch positions between the other block and its adjacent block.

SUMMARY

According to an aspect of the disclosure, a game providing method is provided. The game providing method may include: displaying a game interface comprising a plurality of blocks; detecting a first interaction on a first block among the plurality of blocks; specifying the first block as a trigger block in response to the first block; detecting a second interaction on a second block adjacent to the first block; and performing, based on a characteristic of the second interaction, either one of switching positions between the first block and the second block, and specifying the second block as the trigger block.

According to an embodiment, the second block may be adjacent to the first block, and located on a left, right, upper, or lower side of the first block.

According to an embodiment, the performing may include performing, based on a holding time of the second user interaction, either one of switching positions between the first block and the second block, and specifying the second block as the trigger block.

According to an embodiment, the second block may be specified as the trigger block when the second user interaction is detected longer than a predetermined time length.

According to an embodiment, the predetermined time length may be equal to 0.4 second.

According to an embodiment, the performing may include performing, based on whether the second user interaction is a drag input, either one of switching positions between the first block and the second block, and specifying the second block as the trigger block.

According to an embodiment, when the drag input starts from the first user interaction, a position of the first block may be switched with a position of the second block.

According to an embodiment, when the drag input starts from the second user interaction, the second block may be specified as the trigger block.

According to an embodiment, a position of the second block may be switched with a position of a second block which is adjacent to the second block in a direction identified by the drag input.

According to an embodiment, the performing may include performing, based on whether the second user interaction is extended from the first user interaction, either one of switching positions between the first block and the second block, and specifying the second block as the trigger block.

According to an embodiment, when the second user interaction is extended from the first user interaction, positions between the first block and the second block may be switched.

According to an embodiment, the performing may include: when the second user interaction is not extended from the first user interaction, performing, based on a holding time of the second user interaction, either one of switching positions between the first block and the second block, and specifying the second block as the trigger block.

According to an embodiment, the second block may be specified as the trigger block when the second user interaction is detected longer than a predetermined time length or the second user interaction is extended from the game interface over a predetermined range.

According to an embodiment, the method may further include: when the switching is performed, determining whether the first block or the second block satisfies a predetermined condition; and undoing the switching when the first block and the second block do not satisfy the predetermined condition.

According to an embodiment, the predetermined condition may include at least one of a first condition where the first block is arranged in a line with at least two first adjacent blocks of same appearances to the first block, and a second condition where the second block is arranged in a line with at least two second adjacent blocks of same appearances to the second block.

According to an embodiment, the method further includes: removing the first block and the first adjacent blocks and substituting the removed first block and the removed first adjacent blocks with at least three blocks when the first condition is satisfied, and removing the second block and the second adjacent blocks and substituting the removed second block and the removed second adjacent blocks with at least three blocks when the second condition is satisfied.

According to an embodiment, when the first condition or the second condition is satisfied, an appearance of the first block and an appearance of the second block may be different.

According to an embodiment, when the first condition or the second condition is satisfied, appearances of the first adjacent blocks and appearances of the second adjacent blocks may be different.

According to another aspect of the disclosure, a computer readable medium is provided. The computer readable medium stores instructions which, when executed, may cause at least one processor to carry out the game providing method.

According to another aspect of the disclosure, a game providing apparatus is provided. The game providing apparatus may include a memory storing instructions; and at least one processor configured to execute the instructions to: display a game interface comprising a plurality of blocks; detecting a first interaction on a first block among the plurality of blocks; specify the first block as a trigger block in response to the first block; detect a second interaction on a second block adjacent to the first block; and perform, based on a characteristic of the second interaction, either one of switching positions between the first block and the second block, and specifying the second block as the trigger block.

DETAILED DESCRIPTION

Figure 1A:
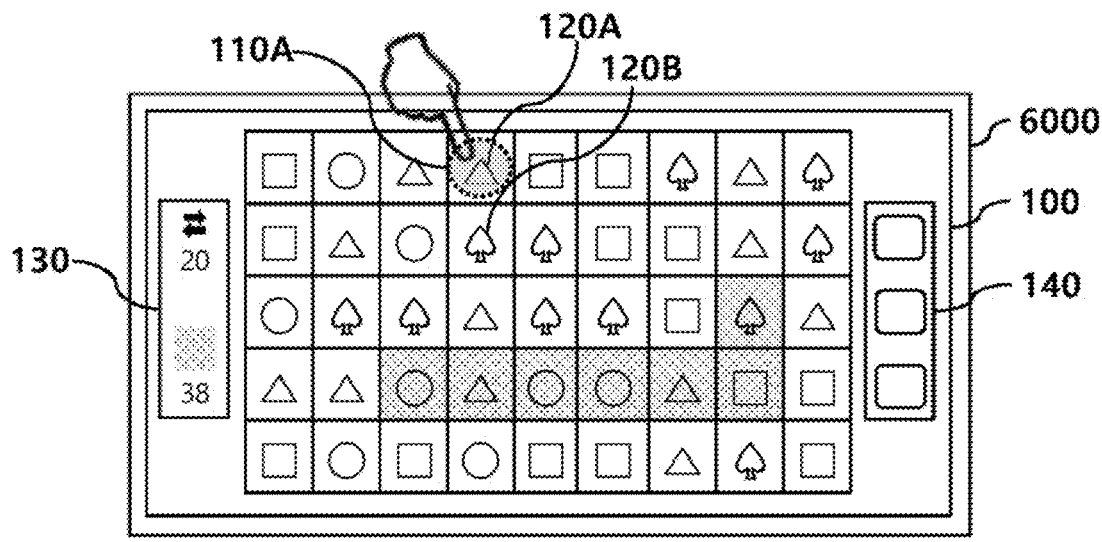
FIG. 1A, FIG. 1B, FIG. 1C, FIG. 1D, and FIG. 1E illustrate game interfaces in which blocks are movable according to an embodiment.

Hereinafter, exemplary embodiments are described in detail with reference to the accompanying drawings. By referring to contents illustrated in the accompanying drawings, a method, apparatus, computer program, and a computer program product according to an embodiment is explained. Like reference numbers in the drawings may indicate identical, functionally similar, and structurally similar components.

Terms including ordinals, such as first, second, etc. may be used to identify various components, but the components are not limited by the terms. These terms are used for the purpose of distinguishing one component from another. For example, a first component may be referred to as a second component. Similarly, a second component may also be referred to as a first component. The term "and/or" includes any combination of a plurality of related items or any one of a plurality of related items.

Terms used herein are used to illustrate embodiments and are not intended to limit or restrict the disclosure. As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination.

When an element is "connected" to another element, the elements may not only be "directly connected" but may also be "electrically connected" via another element therebetween or wirelessly. Herein, it should be understood that the terms "comprises," "comprising," "including," and "having" are inclusive and therefore specify the presence of stated features or components, but do not preclude the presence or addition of one or more other features or components. The term " . . . unit", " . . . module", etc. may refer to a unit in which at least one function or operation is processed and may be embodied as hardware, software, or a combination of hardware and software.

Herein, a "terminal" may refer to a user, a gamer, a player, and an apparatus, such as an electronic device, used by the user, the gamer, or the player, depending on the context. Herein, a user, a gamer, or a player may refer to an avatar or a character controlled by the user, the gamer, or the player, and may refer to an apparatus used by the user, the gamer, or the player, depending on the context.

Herein, a platform to which terminals is connected may indicate a community to which users of the terminals belong. For example, the platform may be a game, or a virtual game space provided by a game, but is not limited thereto. An avatar or a character of a user may exist in the virtual game space. The platform may be a centralized platform operated on a server to which terminals are connected. The platform may be a decentralized platform operated on the terminals which are connected to each other or nodes to which the terminals are connected.

Herein, a game may be a puzzle game, such as a match-three game, but is not limited thereto. A game interface of a match-three game may include a game board which has a certain appearance and size. A puzzle of the match-three game may be solved by users interacting blocks arranged on the game board. The blocks may be arranged on the game board randomly or by a predetermined algorithm. For example, the puzzle of the match-three game may be solved by having three or more blocks of similar or identical appearances to be arranged in a line. Blocks of similar or identical appearances may be referred to as matched blocks. Three or more matched blocks arranged in a line may be removed from the game board, and their vacancies may be filled with other blocks. The match-three game may consist of a plurality of stages, and each stage may be represented as a different game board but is not limited thereto. A variety of winning requirements to accomplish a mission in the match-three game may be used according to an embodiment. For example, the match-three game may be implemented to satisfy a winning requirement when certain blocks or a certain number of blocks are removed from the game board but is not limited thereto. The winning requirement may include limitation on total moves of blocks or playtime. The number of blocks to be removed in one stage may be adjusted or the total moves of blocks, playtime, and etc. may be limited to adjust difficulty of the game but is not limited thereto. According to an embodiment, a match-three game may be implemented to remove four matched blocks arranged in a rectangle from the game board.

Herein, a block indicates an element controlled by users in a match-three game, and users solve a puzzle of the match-three game by controlling blocks in the match-three game. For example, users may interact with blocks arranged on the game board randomly or by a predetermined algorithm to arrange matched blocks in a line by exchanging positions of blocks. The blocks may include an ordinary block which is movable to exchange its position with an adjacent block. The blocks may include an obstacle block or a fixed block which is unmovable and not allowed to exchange its position with other blocks. The blocks may include a locked block which is allowed to exchange its position with other blocks when a predetermined condition is satisfied. When the predetermined condition is satisfied, the locked block may be unlocked and become movable.

Herein, a tile may indicate a space where a block is located in the match-three game and may be represented in two dimensions or three dimensions. Tiles may be fixed on the game board and not movable in the match-three game. When tiles are represented in two dimensions, blocks arranged on the tiles may move in a certain direction through a two-dimensional plane. The blocks may move in four directions of up, down, left, and right, but are not limited thereto. For example, the blocks may move in three directions, five directions, six directions, etc. When blocks move in four directions, the blocks may be represented as a rectangle shape. A position of block may be changed with a position of adjacent block across a boundary of a tile. When blocks move in six directions, the blocks may be represented as a hexagonal shape. When tiles are represented in three dimensions, blocks may switch their positions with adjacent blocks across boundaries of tiles. For example, when blocks move in six directions through a three-dimensional plane, the blocks may be represented as a cubical shape.

Tiles may be filled with blocks but may be vacancies which are not filled with blocks. Variety of algorithms to fill a vacancy with a block may be used according to an embodiment. According to an embodiment, after matched blocks are removed, their vacancies may be filled with blocks previously located above the matched blocks but are not limited thereto. For example, the vacancies may be filled with blocks located on the left or the right of the matched blocks, located next to the matched blocks, or located below the matched blocks. According to an embodiment, a block generated randomly or by a predetermined algorithm may be used to fill the vacancy.

The match-three game may be displayed by a combination of variety of graphic representations. A graphic representation of the match-three game may include a graphic object of a tile or a block as well as a graphic effect regarding the tile or the block. A graphic representation may not only satisfy visual sense of users playing a puzzle game, but also help users to understand game rules of the puzzle game by visualizing a sequence resulting from a user interaction based on rules or algorithms of the puzzle game. In an example of a match-three game, three or more matched blocks may be arranged in a line by a user substituting one block with an adjacent block, and a graphic representation of bursting the matched blocks like balloons may be displayed. Accordingly, the user may be aware that the matched blocks are removed from a game board, and intuitively recognize a rule of the match-three game, that is, to remove blocks by arranging matched blocks in a line. Appropriate graphic representation may allow users to understand intuitively a rule of a game.

Users may be provided with items in a match-three game in order to make the match-three game more enjoyable. An item may be implemented as a movable element in a game board and may be referred to as an item block. An item may be implemented as a selectable element outside the game board and may be referred to as a special item. When an item block is selected, a sequence resulting from a characteristic of the item block may be produced in the match-three game. Upon use of an item block, blocks located in the same line with the item block, blocks located within a certain range from the item block, or blocks corresponding to the item may be removed. Item blocks may be combined together to be used. For example, when an item block for removing blocks located in the same line with the item block, and an item block for removing blocks located within a certain range from the item block interact with each other (positions of two item blocks are switched), blocks located within a certain range from the line may be removed. When a special item is selected and a certain point to use the special item is specified, a block on the point, blocks located in a line passing the point, blocks located within a certain range from the point, or blocks corresponding to a block on the certain point may be removed. Furthermore, an item to adjust the number of blocks to be removed in one stage or the total moves of blocks, playtime, and etc. may be provided to users.

An aspect of the disclosure is to provide a way to identify an intention of a user in a puzzle game.

Another aspect of the disclosure is to provide a way to identify a selection of a user in a puzzle game while keeping up a pace of the game.

FIG. 1A, FIG. 1B, FIG. 1C, FIG. 1D, and FIG. 1E illustrate game interfaces in which blocks are movable according to an embodiment.

Referring to FIG. 1A, a game providing apparatus 600 may display a game interface 100 to provide users with a game. The game interface 100 may include a game board consisting of a plurality of tiles, and blocks, such as tiles 120A and 120B, located on tiles. The game board may have a certain appearance and a certain size. Referring to FIG. 1A, the game board may have a rectangular shape with 9×5. The game board of 9×5 may consist of 45 tiles, and 45 blocks may be located on 45 tiles, respectively. The game interface 100 may further include a progress window 130 for indicating a progress state of the game, and an item window 140 for indicating special items in the game.

According to an embodiment, the progress window 130 may indicate an available number of moves to move a block. Referring to FIG. 1A, a user may move a block at most 20 times to satisfy a winning requirement. A variety of winning requirements may be considered in a match-three game according to an embodiment. According to an embodiment, the progress window 130 may indicate more of winning requirements, such as, changing appearances of 7 tiles as illustrated in FIG. 1A.

According to an embodiment, the item window 140 may indicate available items and purchasable items.

According to an embodiment, the game providing apparatus 6000 may detect a user interaction. When the game providing apparatus 6000 includes a touch screen display, a user interaction may be detected based on a touch input to the touch screen display. Referring to FIG. 1A, the game providing apparatus 6000 may detect a first user interaction 110A on the block 120A in the game interface 100, the block 120A is selected in response to the detected first user interaction 110A. Furthermore, an indicator 150A indicating that the block 120A is selected may be displayed in the game interface.

Figure 1B:
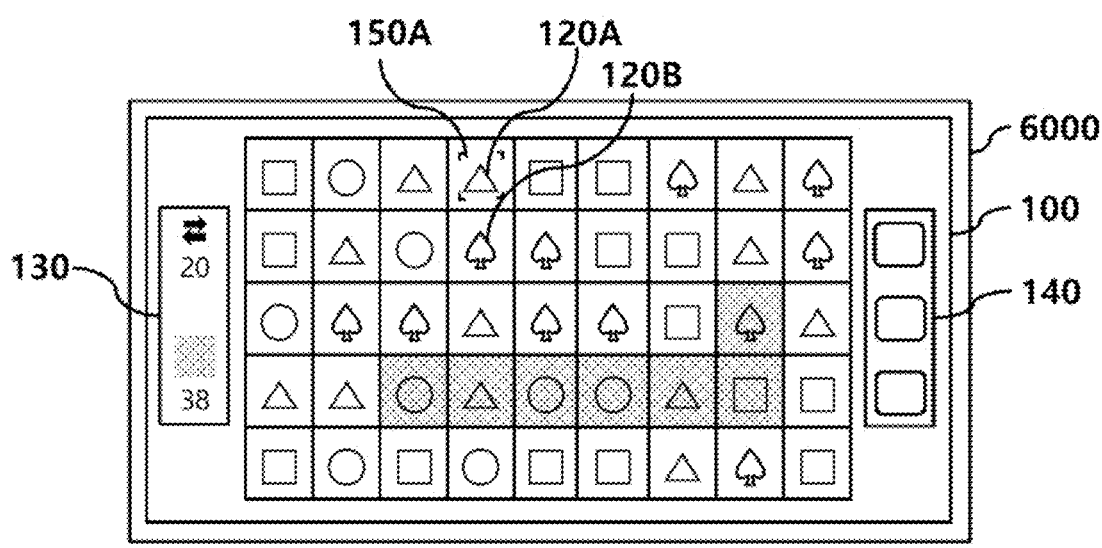

According to an embodiment, the block 120A may be specified as a trigger block movable in four directions of up, down, left, or right. Accordingly, the block 120A specified as the trigger block may switch its position with an upper-adjacent block, a lower-adjacent block 120B, a left-adjacent block, or a right-adjacent block. That is, the block 120A specified as the trigger block and its adjacent block may switch their positions. Referring to FIG. 1B, the indicator 150A indicating that the block 120A is selected may be an indicator 150A indicating that the block 120A is specified as the trigger block.

Figure 1C:
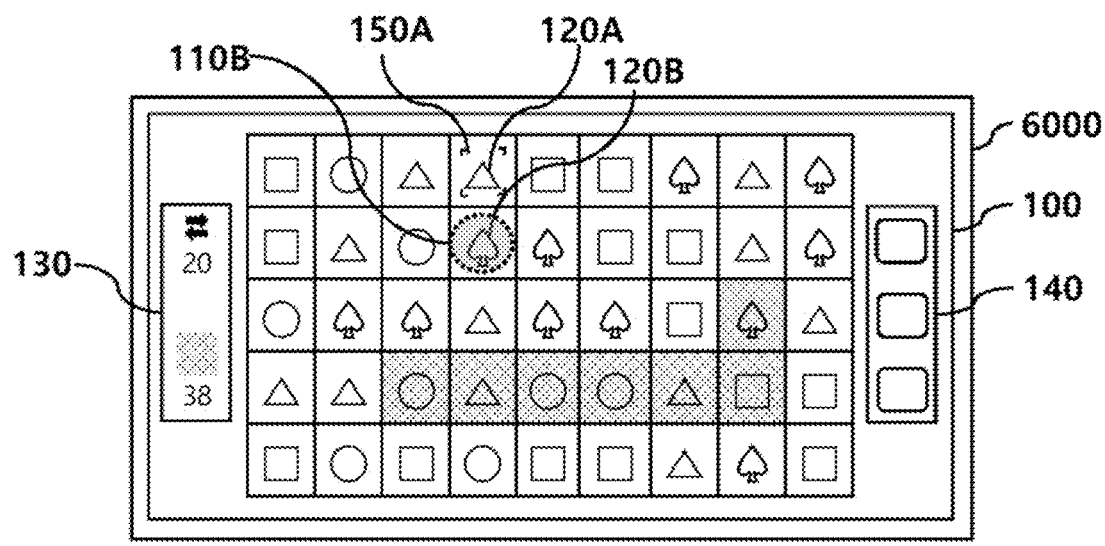
Figure 1D:
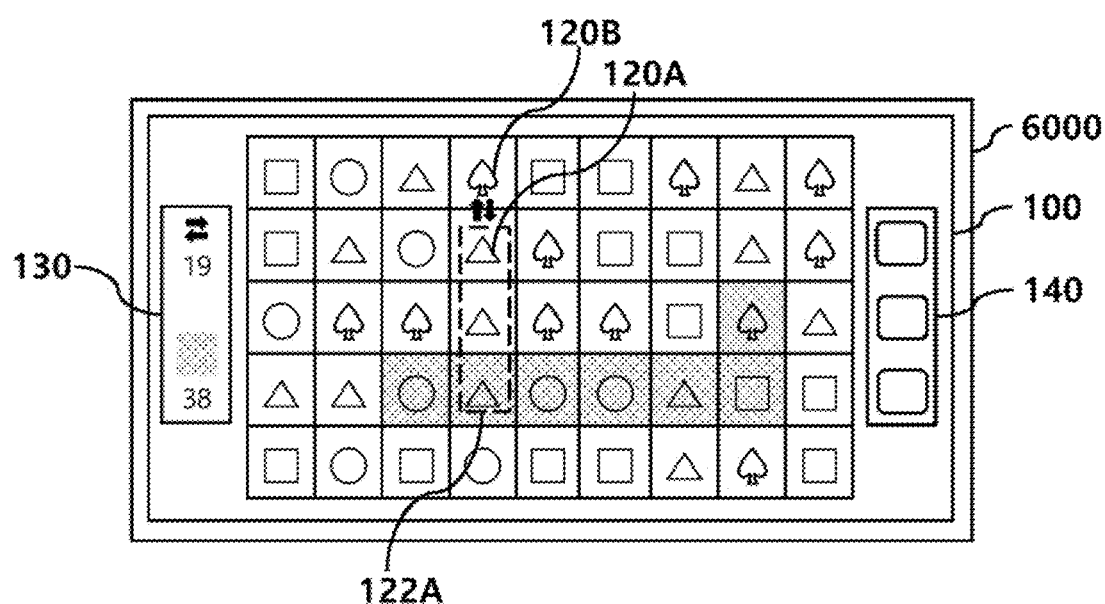

Referring to FIG. 1C, the game providing apparatus 6000 may detect a second user interaction 110B on an adjacent block 120B which is located below the selected block 120A. Referring to FIG. 1D, the game providing apparatus may switch positions between two blocks 120A and 120B in response to the second user interaction. According to an embodiment, the game providing apparatus may switch positions between two blocks 120A and 120B in response to detecting the second user interaction having a shorter holding time than a predetermined time length.

According to an embodiment, the game providing apparatus 6000 may determine whether the two blocks 120A and 120B whose positions are switched satisfy a predetermined condition. For example, the predetermined condition may include a condition where at least one of the two blocks 120A and 120B is arranged in a line with at least two adjacent matched blocks. When the predetermined condition is not satisfied, that is, when the two blocks 120A and 120B whose positions are switched do not constitute three matched blocks arranged in a line, the game providing apparatus 6000 may undo the switching positions of the two blocks 120A and 120B, that is, the two blocks 120A and 120B may be switched back to their original positions. Accordingly, a graphic representation of the two blocks 120A and 120B returning back to their original positions may be displayed.

According to an embodiment, the game providing apparatus may select the block 120B adjacent to the selected block 120A as the trigger block in response to detecting the second user interaction having a longer holding time than a predetermined time length. According to an embodiment, the switching positions of the two blocks 120A and 120B, or the specifying the adjacent block 120B as the trigger block may be performed based on a holding time of the second user interaction 110B, which will be further explained later by referring to FIG. 2A, FIG. 2B, and FIG. 2C.

Figure 1E:
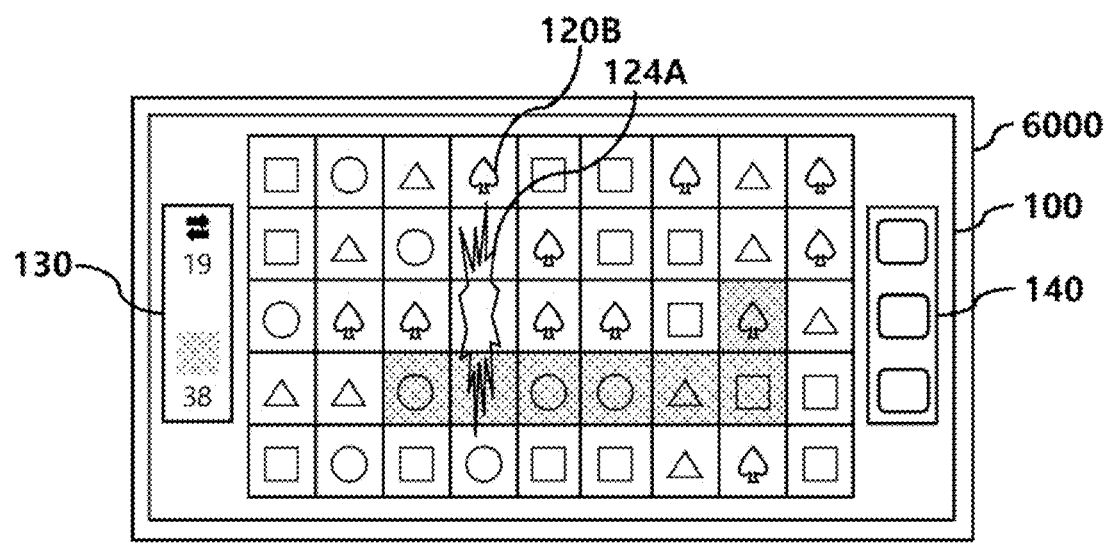

Referring to FIG. 1D, as a result of switching positions between the two blocks 120A and 120B, three matched blocks 122A, including the block 120A, may be arranged in a line. According to an embodiment, the matched blocks 122A may have identical or similar appearance but are not limited thereto. After the selected block 120A moves down one tile to substitute the adjacent block 120B, an available number of moves to move a block may decrease by 1. Referring to FIG. 1E, a graphic representation 124A of bursting three matched blocks 122A may be displayed in the game interface 100, which may let a user to recognize that the matched blocks 122A are removed. Empty tiles from which the matched blocks 122A are removed may be filled with other blocks. For example, blocks located above the matched blocks 122A may fill the empty tiles after the removal of the matched blocks 122A. The blocks filling up the empty tiles may include the adjacent block 120B substituted by the selected block 120A. Other blocks filling up the empty tiles, which are virtually located above the adjacent block 120B, may be generated randomly or by a predetermined algorithm. FIG. 1D illustrates that the block 120A only satisfies a matching condition (at least three matched blocks in a line) among the two blocks 120A and 120B. When both of the two blocks 120A and 120B may satisfy the matching condition respectively, blocks satisfying the matching condition may be removed from the game interface and their vacancies may be filled with other blocks. When the two blocks 120A and 120B have the same appearance, switching positions between the two blocks 120A and 120B do not produce the matching condition. Therefore, in order for at least one of the two blocks 120A and 120B to satisfy the matching condition, an appearance of the block 120A is different from an appearance of the block 120B, Furthermore, in order for at least one of the two blocks 120A and 120B to satisfy the matching condition, an appearance of an adjacent block to the block 120A is different from an appearance of an adjacent block to the block 120B.

According to an embodiment, tiles where blocks are arranged may play a role in the progress of the match-three game as well as the blocks. According to an embodiment, tiles are unmovable by a user while blocks are movable. According to an embodiment, appearances of tiles affecting a progress of game may be different than appearances of ordinary tiles. According to an embodiment, when matched blocks are removed from tiles, the game providing apparatus 6000 may change an appearance of a tile affecting a progress of game to allow users to recognize that this tile affects a progress of game. Accordingly, the number of left tiles whose appearance to be changed may decrease in the progress window 130.

According to an embodiment, when a winning requirement is satisfied since appearances of 38 tiles change, and then, the game providing apparatus 6000 may display a message window indicating that a stage is cleared.

On the other hand, the second user interaction 110B is received on the block 120B by the user who intends to select the block 120B to move the block 120B in four directions of up, down, left, or right, rather than switching positions between the blocks 120A and 120B. According to an embodiment, the switching positions of the two blocks 120A and 120B, or the specifying the adjacent block 120B as the trigger block may be performed based on a characteristic of the second user interaction 110B. According to an embodiment, the switching positions of the two blocks 120A and 120B, or the specifying the adjacent block 120B as the trigger block may be performed, which is further explained by referring to FIG. 2A, FIG. 2B, and FIG. 2C.

Figure 2A:
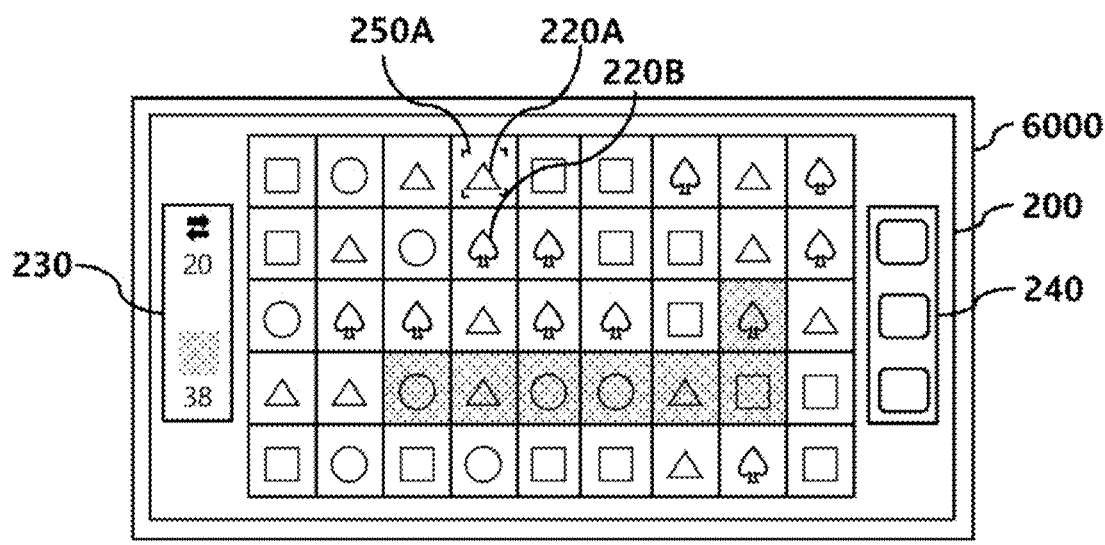
FIG. 2A, FIG. 2B, and FIG. 2C illustrate game interfaces in which a trigger block is specified according to an embodiment.
Figure 2B:
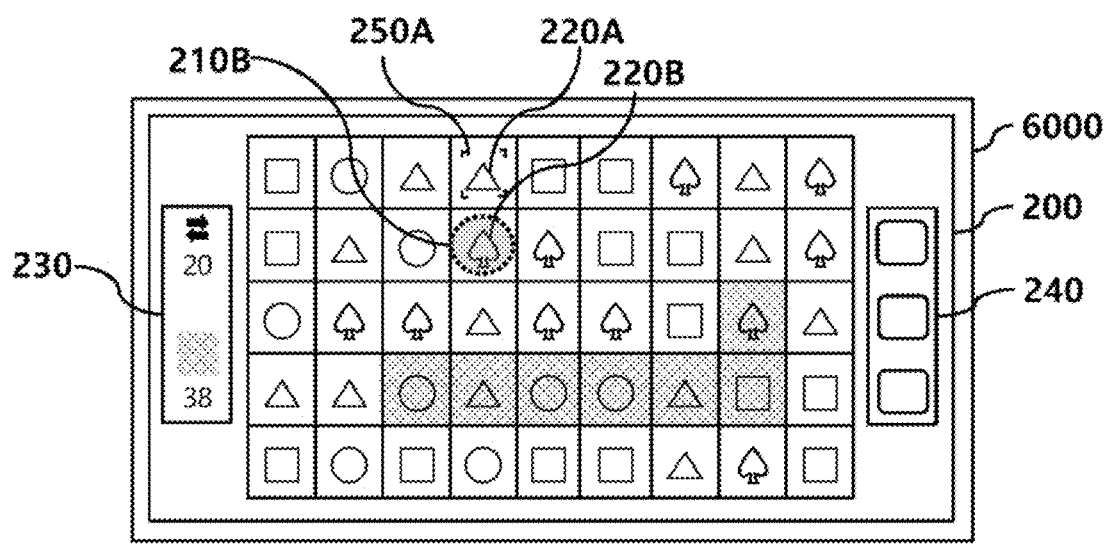
Figure 2C:
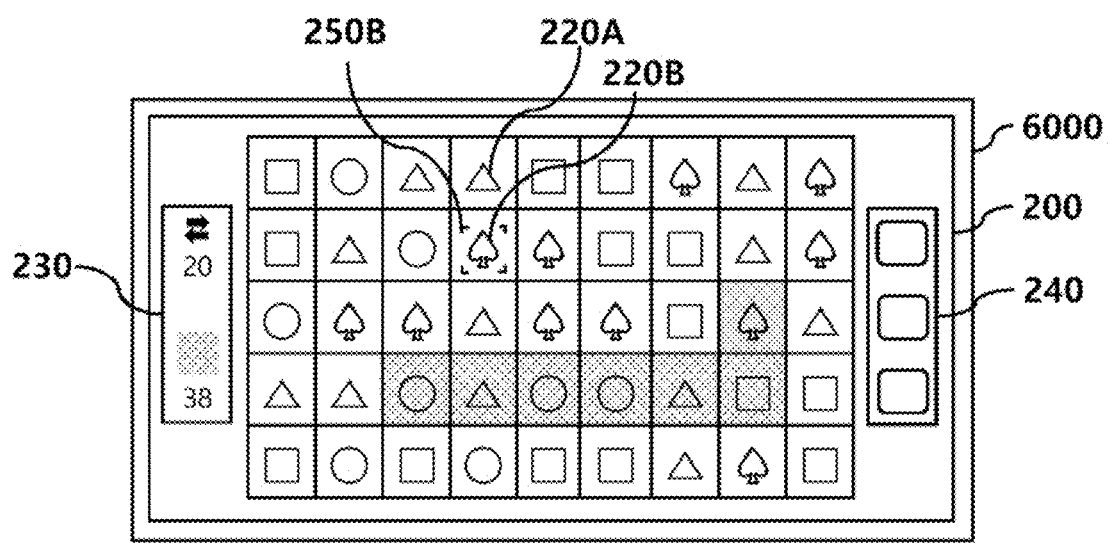

FIG. 2A, FIG. 2B, and FIG. 2C illustrate game interfaces in which a trigger block is specified according to an embodiment.

Referring to FIG. 2A, a game interface 200 may include a game board, a progress window 230, and an item window 240. According to an embodiment, a block 220A may be selected based on a first user interaction, and an indicator 250A may be displayed in the game interface 200 to show that the block 220A is selected as illustrated in FIG. 2A. The selected block 220A may be specified as a trigger block to switch positions with an adjacent block.

Referring to FIG. 2B, after the block 220A is selected, when a second user interaction 210B is detected on an adjacent block 220B to the selected block 220A, the game providing apparatus 6000 may specify the adjacent block 220B of the selected block 220A as the trigger block based on a predetermined condition. For example, the game providing apparatus 6000 may specify the adjacent block 220B of the selected block 220A as the trigger block based on a holding time of the second user interaction 210B. The user may tap and hold on the block 220B, and the second user interaction 220B may be detected on the block 220B, and the holding time of the second user interaction 220B may increase as the user keeps his or her touch on the block 220B.

When the holding time of the second user interaction 210B on the adjacent block 220B of the selected block 220A is shorter than a predetermined time length, that is, when a user taps on the adjacent block 220B of the selected block 220A, the game providing apparatus 6000 may switch positions between the blocks 220A and 220B.

When the holding time of the second user interaction 210B on the adjacent block 220B of the selected block 220A is longer than the predetermined time length, that is, when a user taps and holds on the adjacent block 220B of the selected block 220A, the game providing apparatus 6000 may specify the adjacent block 220B of the selected block 220A as a trigger block as illustrated in FIG. 2C, and an indicator 250A indicating that the block 220B is specified as the trigger block may be displayed. A positions of the trigger block 220B indicated by the indicator 250A may be switched with an adjacent block to the trigger block 220B. According to an embodiment, the predetermined time length may be a value from a range 0.1 second and 0.5 second. For example, the predetermined time length may be 0.4 second.

According to an embodiment, a pace of the match-three game may be kept up by performing the switching positions between the selected block 220A and its adjacent block 220B or the specifying the adjacent block 220B as a trigger block based on the holding time of the second user interaction.

According to an embodiment, a user-intended result may be produced by performing the switching positions between the selected block 220A and its adjacent block 220B or the specifying the adjacent block 220B as a trigger block based on the holding time of the second user interaction.

Figure 3:
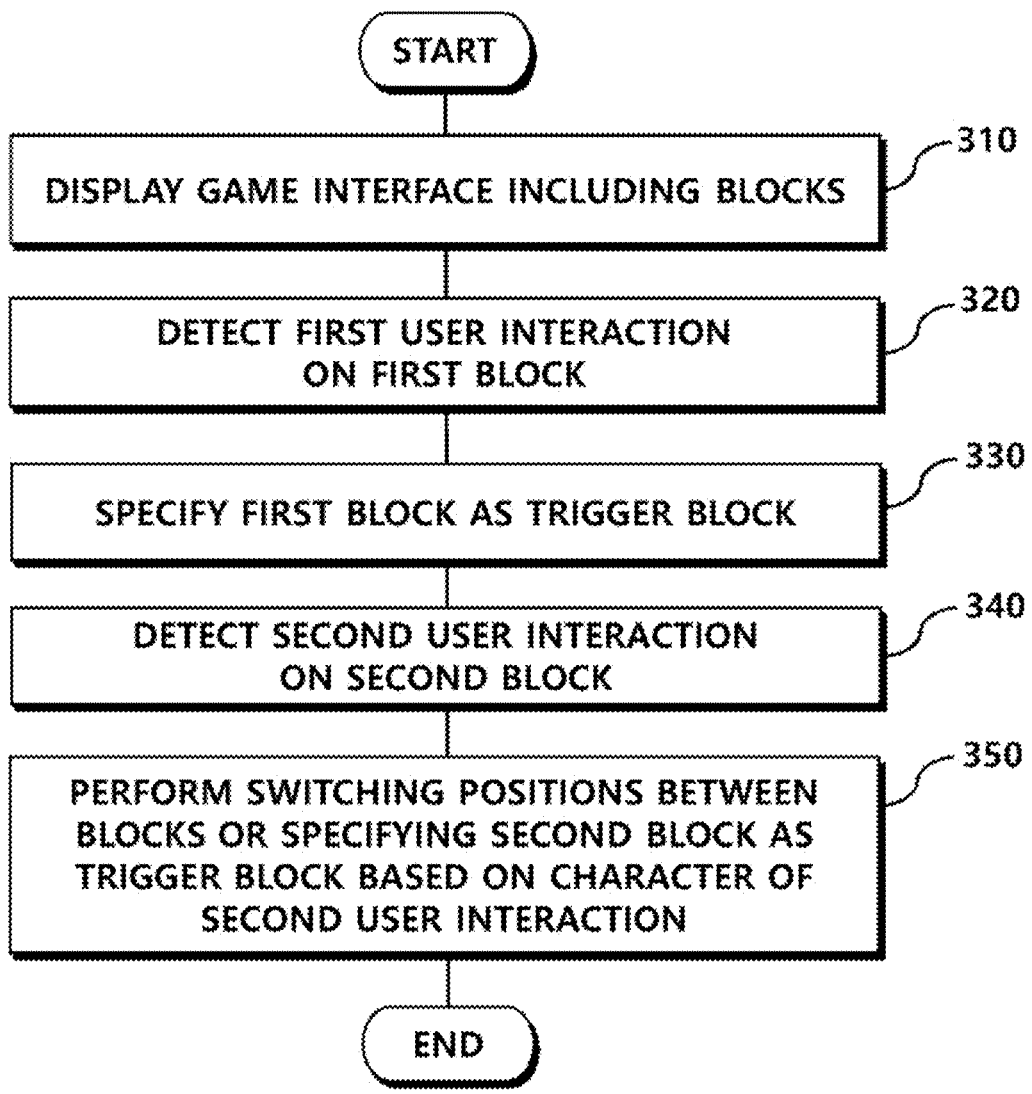
FIG. 3 is a flowchart of a game providing method according to an embodiment.

FIG. 3 is a flowchart of a game providing method according to an embodiment.

At 310, a game providing apparatus may display a game interface including blocks. The blocks may be arranged on tiles which constitute a game board.

At 320, the game providing apparatus may detect a first user interaction on a first block. The first user interaction may be a tap on the first block but is not limited thereto. For example, the first user interaction may be a drag input starting from the first block, which will be further explained later by referring to FIG. 4.

At 330, the game providing apparatus may specify the first block as a trigger block in response to the first user interaction. The first block may be instantly specified as the trigger block in response to the first user interaction. After the first block is specified as the trigger block, if a second block adjacent to the first block is tapped, positions between the first and second blocks may be switched. After the first block is specified as the trigger block, if a user interaction is detected on another block which is not adjacent to the first block, the other block may be instantly specified as the trigger block.

At 340, the game providing apparatus may detect a second user interaction on a second block.

At 350, the game providing apparatus may perform, based on a characteristic of the second interaction, either one of switching positions between the first block and the second block, and specifying the second block as the trigger block. When the second user interaction is detected on the second block shorter than a predetermined time length, for example, when the second block is tapped, positions of the first block and the second blocks may be switched because the second block is adjacent to the first block.

According to an embodiment, when the second user interaction is detected longer than the predetermined time length, for example, when the second block is tapped and held, the second block may be specified as a trigger block.

According to an embodiment, the switching positions of the first and second blocks or the specifying the second block as the trigger block may be performed based on whether the second user interaction is a drag input. For example, when the first user interaction is not a drag input, and a drag input is detected starting from the second user interaction, the second block may be instantly specified as the trigger block and a position of the second block may be switched with a position of an adjacent block located in a direction of the drag input. Explanation of drag inputs will be further explained by referring to FIG. 4, FIG. 5A, and FIG. 5B.

Figure 4:
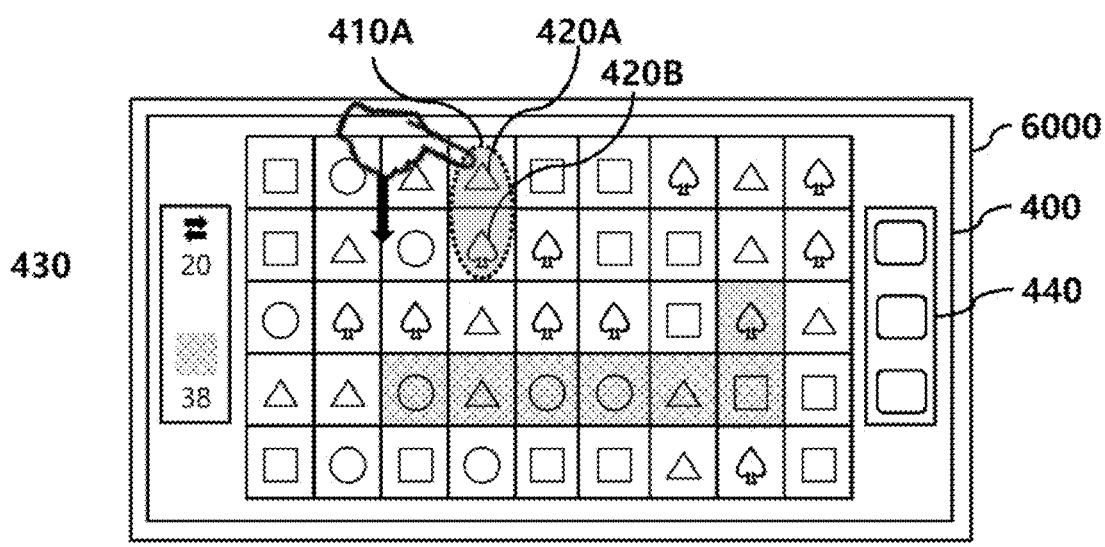
FIG. 4 illustrates a game interface in which a block is moved based on a drag input according to an embodiment.

FIG. 4 illustrates a game interface in which a block is moved based on a drag input according to an embodiment.

Figure 5A:
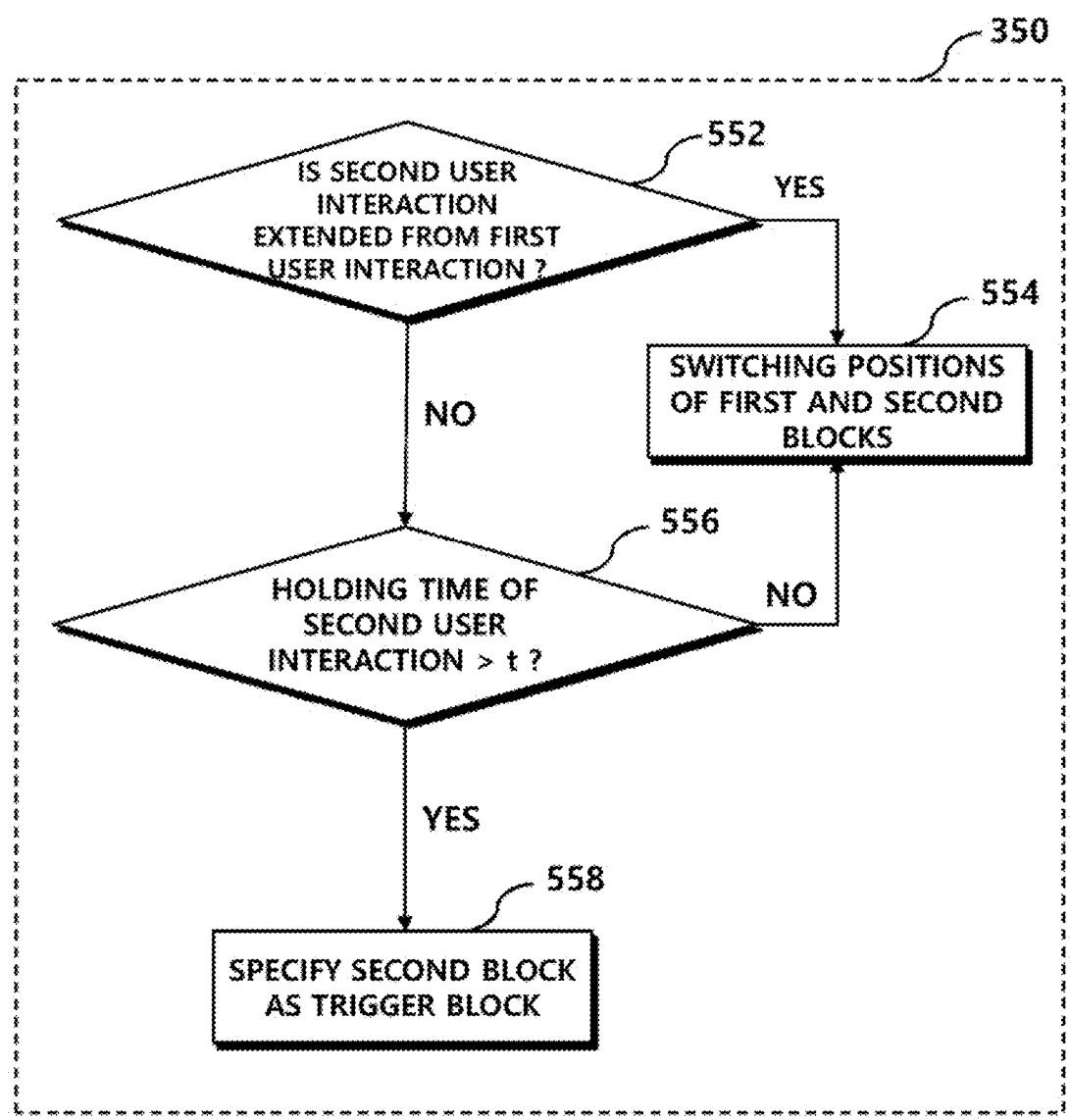
FIG. 5A is a flowchart of a method of specifying a trigger block based on whether a first user interaction is a drag input.

FIG. 5A is a flowchart of a method of specifying a trigger block based on whether a first user interaction is a drag input.

Figure 5B:
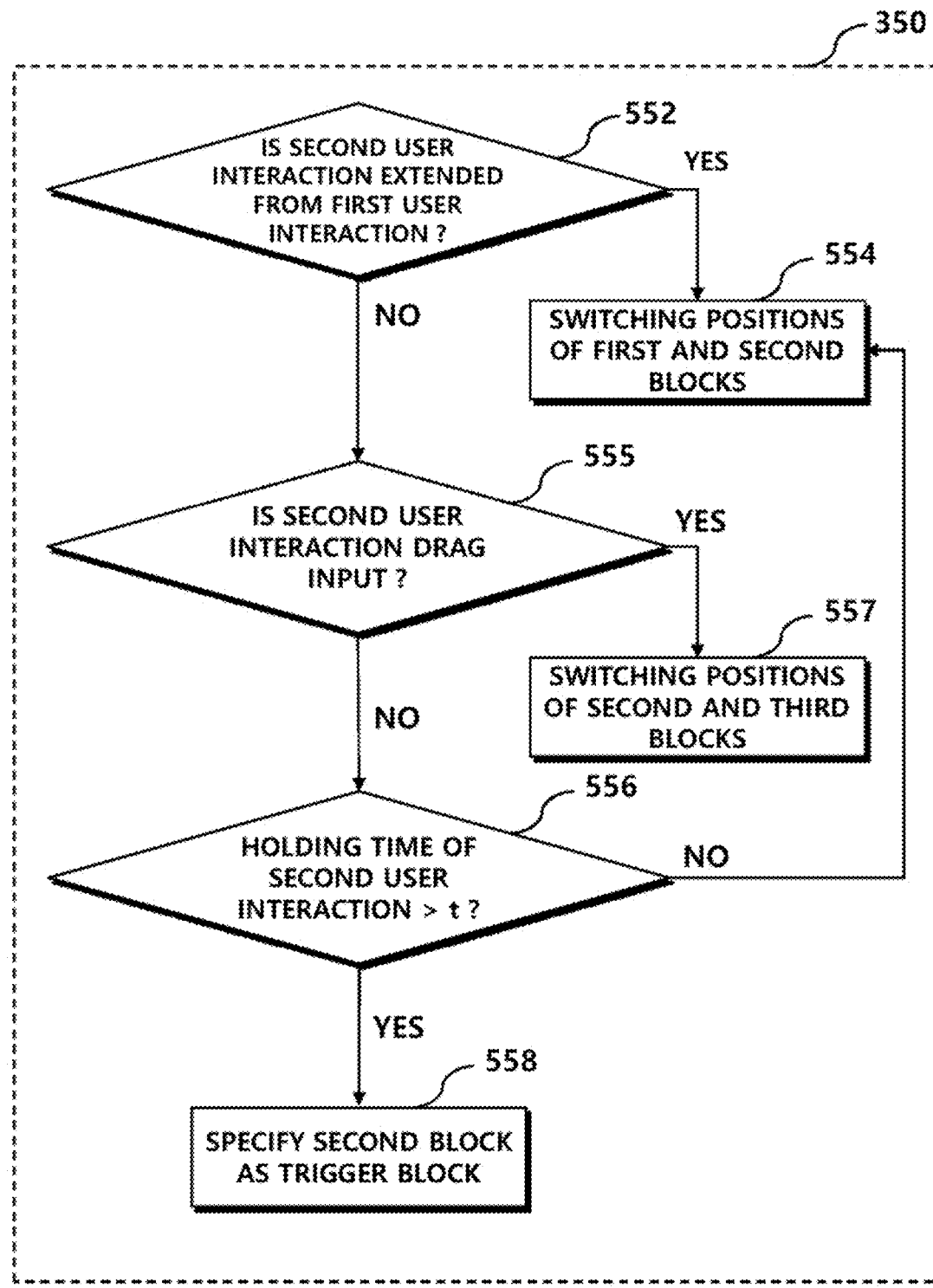
FIG. 5B is a flowchart of a method of specifying a trigger block based on whether a first user interaction and a second user interaction are drag inputs.

FIG. 5B is a flowchart of a method of specifying a trigger block based on whether a first user interaction and a second user interaction are drag inputs.

A block may move in a direction of up, down, left, or right in the match-three game. When a drag input 410A starting from the first block 420A and moving down is detected, the game providing apparatus 6000 may change positions of the first block 420A and the second block 420B.

At 350 of FIG. 3, the game providing apparatus 6000 may perform, based on a characteristic of the second interaction, either one of switching positions between the first block 420A and the second block 420B, and specifying the second block 420B as the trigger block. According to an embodiment, referring to FIG. 5A, the game providing apparatus 6000 may determine whether the second user interaction is extended from the first user interaction at 552. For example, referring to FIG. 4, when the first user interaction 410A is a drag input 410A starting from the first block 420A and moving down to pass the second block 420B, the second user interaction on the second block 420B may be recognized as an extension of the first user interaction 410A. That is, the second user interaction on the second block 420B is a part of the drag input 410A starting from the first block 420A, and the game providing apparatus 6000 may change a position of the first block 420A and a position of the second block 420B.

When the second user interaction is not extended from the first user interaction, for example, when the first user interaction is not a drag input 410A and the second user interaction is separate from the first user interaction, the game providing apparatus 6000 may perform the switching positions of the first block 420A and the second block 420B or the specifying the second block 420B as the trigger block based on the holding time of the second user interaction. When the holding time of the second user interaction is shorter than a predetermined time length, for example, the second block is tapped, the game providing apparatus 6000 may switch positions between the first block 420A and the second block 420B. When the holding time of the second user interaction is longer than a predetermined time length, for example, the second block is tapped and held, the game providing apparatus 6000 may specify the second block 420B as the trigger block. According to an embodiment, the predetermined time length may be a value from a range 0.1 second and 0.5 second. For example, the predetermined time length may be 0.4 second.

According to an embodiment, the game providing apparatus 6000 may determine whether the second user interaction on the second block 420B is a drag input before identifying the holding time of the second user interaction on the second block 420B to perform the switching positions of the first block 420A and the second block 420B or the specifying the second block 420B as the trigger block.

Referring to FIG. 5B, when the second user interaction is not extended from the first user interaction, that is, when the first user interaction is not a drag input 410A, the game providing apparatus 6000 may determine whether the second user interaction is a drag input at 555.

For example, the first user interaction is not a drag input 410A, and the second user interaction may be a drag input starting from the second block 420B. At 557, the game providing apparatus may switch a position of the second block 420B and a position of a third block adjacent to the second block 420B. The third block may be adjacent to the second block 420B and is located in a direction of the drag input starting from the second block 420B. Compared to FIG. 5A, redundant explanation is omitted in explanation of FIG. 5B.

According to an embodiment, the switching positions between the first block 420A and the second block 420B or the specifying the second block 420B as the trigger block may be performed based on whether the second user interaction on the second block 420B is a drag input extended from the first user interaction, and the holding time of the second user interaction.

According to an embodiment, the switching positions between the first block 420A and the second block 420B or the specifying the second block 420B as the trigger block may be performed based on whether the second user interaction on the second block 420B is a drag input extended from the first user interaction, whether the second user interaction is a drag input, and the holding time of the second user interaction.

According to an embodiment, a block may be selected in the match-three game as intended by a user, and a pace of the game may be kept up because no additional input, such as tapping a space where no block exist, is necessary.

Figure 6:
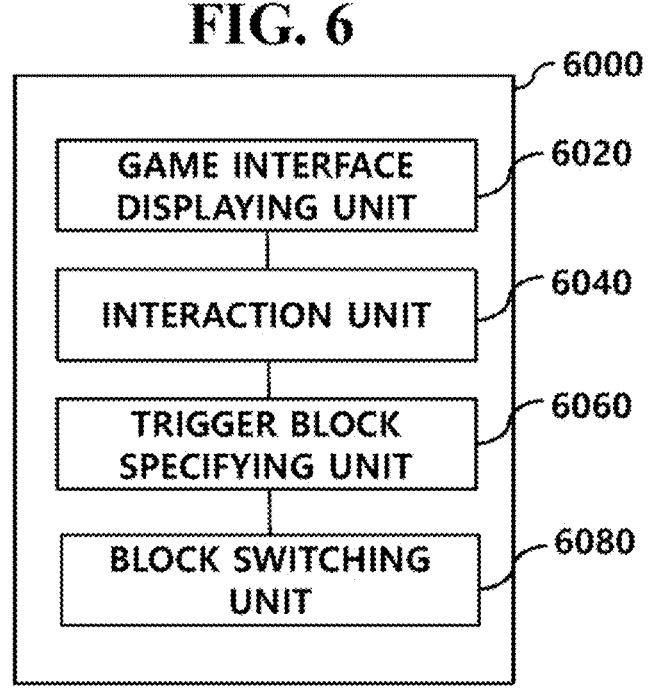
FIG. 6 is a block diagram of a game providing apparatus according to an embodiment.

FIG. 6 is a block diagram of a game providing apparatus according to an embodiment.

Referring to FIG. 6, the game providing apparatus 6000 may include a game interface displaying unit 6020, an interaction unit 6040, a trigger specifying unit 6060, and a block switching unit 6080.

The game interface displaying unit 6020 may display a game interface and related graphic representations. Functionality of the game interface displaying unit 6020 is substantially same with operations explained above, for example, by referring FIG. 3, thus, redundant explanation is omitted.

The interaction unit 6040 may detect an input of a user playing the match-three game. A trigger block may be specified by the trigger block specifying unit 6060 based on the detected input. Positions of adjacent two blocks may be switched by the block switching unit 6080. Functionality of the interaction unit 6040, the trigger block specifying unit 6060, and the block switching unit 6080 is substantially same with operations explained above, for example, by referring to 320, 330, 340, and 350 of FIG. 3, thus, redundant explanation is omitted.

The game providing apparatus 6000 may be a terminal but is not limited thereto. For example, the game providing apparatus 6000 may be a server, or a system including the server and the terminal. Functionality of the game providing apparatus 6000 may be performed at the terminal and the server. Some functionality may be performed at the terminal, and other functionality may be performed at the server. Each component of the game providing apparatus 6000 may be implemented by interaction between a plurality of devices, such as the server and the terminal. Sub-components of each component may be implemented by interaction between the server and the terminal.

Figure 7:
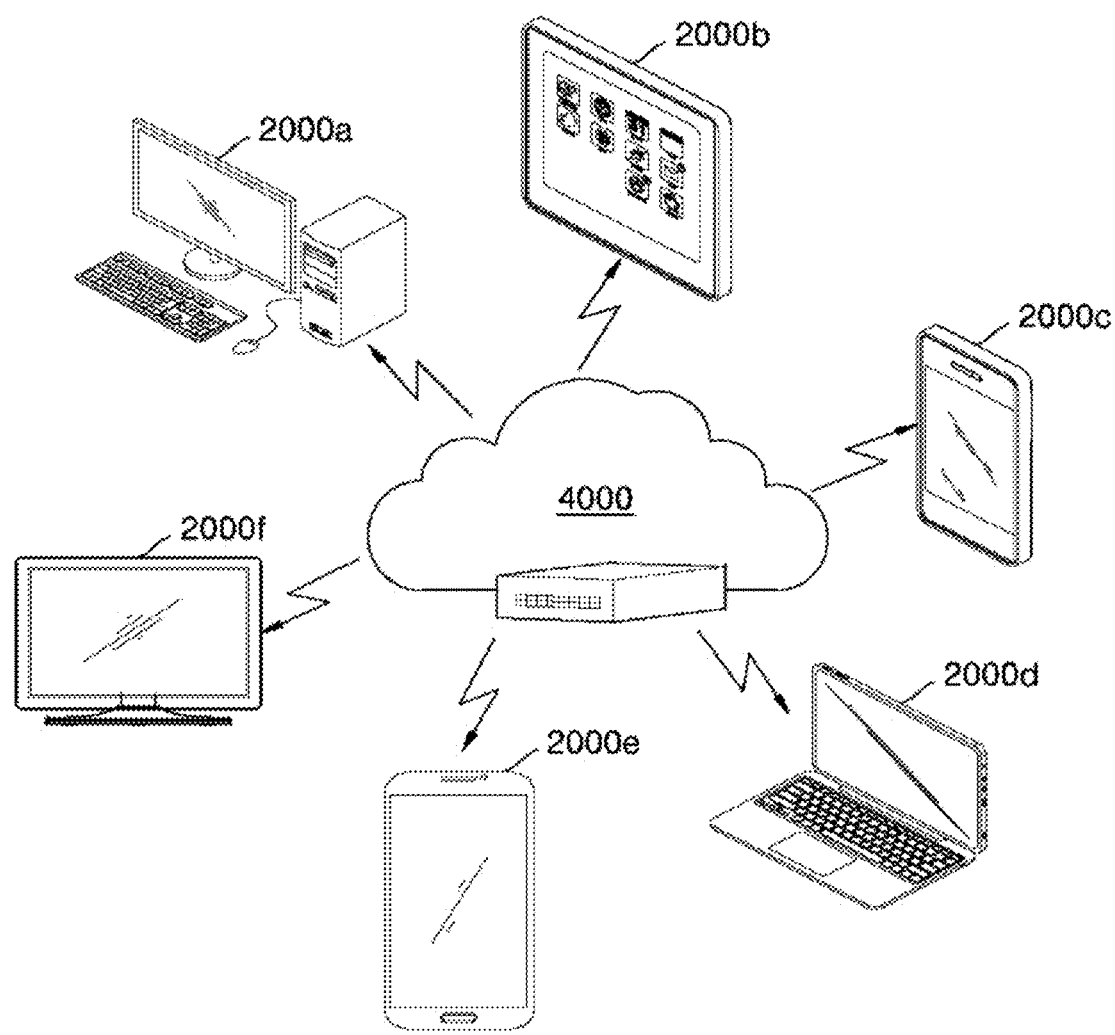
FIG. 7 illustrates an online game providing system including a server and a terminal according to an embodiment.

FIG. 7 illustrates an online game providing system including a server and a terminal according to an embodiment.

The online game provision system according to an embodiment may include a server 4000 and a plurality of terminals 2000a, 2000b, 2000c, 2000d, 2000e, and 2000f as shown in FIG. 7. The server 4000 may provide an online game to the plurality of terminals 2000a, 2000b, 2000c, 2000d, 2000e, and 2000f by servicing online games through the network.

FIG. 7 shows, as examples of terminals used by a user, a desktop computer 2000a, a tablet 2000b, a mobile phone 2000c, a laptop 2000d, a smartphone 2000e, and a television 2000f, but are not limited thereto. The terminals may include various electronic devices such as a personal digital assistant (PDA), a portable multimedia player (PMP), a navigation device, an MP3 player, a digital camera, a refrigerator, a washing machine and a vacuum cleaner.

According to an embodiment, the server 4000 may be operated by a game provider, and server 4000 may include, but is not limited to, a single server, a collection of servers, and a cloud server. The server 4000 may provide online games to users and may include a database for storing data of the users. The server 4000 may include a transaction server for generating and processing transactions.

According to an embodiment, a network may refer to connections established (or configured) using any communication means. The network may be established between terminals 2000a, 2000b, 2000c, 2000d, 2000e and 2000f. The network may be established between terminals 2000a, 2000b, 2000c, 2000d, 2000e, and 2000f and the server 4000.

The communication means may be used with a certain communication standard, a certain frequency band, a certain protocol, and/or a certain channel. The communication means includes means using a short distance communication, a long-distance communication, a wireless communication, and/or a wired communication, but is not limited thereto. For example, the communication means may include, but is not limited to, the Internet, wireless fidelity (Wi-Fi), Bluetooth, Bluetooth Low Energy (BLE), Near Field Communication (NFC), Zigbee, 3G, 4G, Long-Term Evolution (LTE), 5G.

The short distance communication means may allow devices within a short range to communicate with each other. The short distance communication means may include, but is not limited to, Bluetooth, BLE, NFC, Zigbee.

The long-distance communication means may allow devices to communicate with each other regardless of distances between them. For example, the long-distance communication means may, but is not limited thereto, comprise a means communicating through a repeater, such as an access point (AP), and/or a means communicating through a cellular network (3G, 4G, LTE, 5G, etc.).

Communication between the server 4000 and the terminals 2000a, 2000b, 2000c, 2000d, 2000e, and 2000f may be performed through any communication means while the server 4000 serving the online game through the network.

An online game may include a puzzle game, a match-three game, role playing game (RPG), a tabletop RPG (TRPG), a massively multiplayer online RPG (MMORPG), a multiplayer online battle arena (MOBA) game, an Aeon of Strife (AOS) game, a real time strategy (RTS) game, a first person shooter (FPS) game, a trading card game (TCG), a collectible card game (CCG), a sports game, a fighting game, a puzzle game, a shooting game, etc., but is not limited thereto. A competition between users or a competition between a user and a computer (e.g., artificial intelligence) may occur in the online game. The online game may be implemented in various forms.

Figure 8:
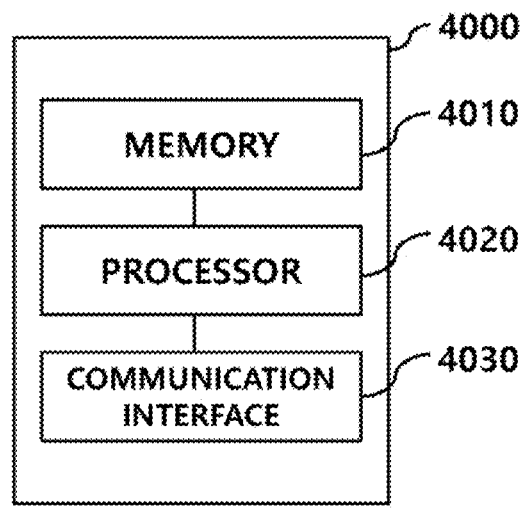
FIG. 8 is a block diagram of a server according to an embodiment.

FIG. 8 is a block diagram of a server according to an embodiment.

As shown in FIG. 8, the server 4000 may include a memory 4010, a processor 4020, and a communication interface 4030. However, all the components shown in FIG. 8 should not be regarded as essential components of the server 4000. The server 4000 may be implemented by more or fewer components than the components shown in FIG. 8.

The memory 4010 may store programs and instructions for processing and controlling of the processor 4020, and store data inputted to or outputted from the server 4000.

The memory 4010 may store instructions that enable the server 4000 to perform various operations in accordance with embodiments herein. The memory 4010 may store information necessary for service of an online game. For example, the memory 4010 may store information about accounts, characters, and items of users, but is not limited thereto, may store various information.

The memory 4010 may include at least one from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, and an optical disc. Programs stored in the memory 4010 may be classified into a plurality of modules.

The processor 4020 may generally control the overall operation of the server 4000. For example, the processor 4020 may execute programs stored in the memory 4010 to control components included in the server 4000. The processor 4020 may include multiple processors, such as one or more central processing units (CPUs), one or more graphics processing units (GPUs), and/or combinations thereof.

The processor 4020 may be configured to execute instructions stored in memory 4010 to cause the server 4000 to perform various operations in accordance with various embodiments herein.

The communication interface 4030 may be an electronic circuit designed to communicate with other devices with conforming to a certain standard.

The communication interface 1510 may include a Bluetooth communication interface, a Bluetooth low energy (BLE) communication interface, a near field communication (NFC) interface, a wireless fidelity (Wi-Fi) communication interface, a ZigBee communication interface, an infrared data association (IrDA) communication interface, a Wi-Fi direct (WFD) communication interface, a ultra-wideband (UWB) communication interface, an Ant+ communication interface, a Z-wave communication interface, a 3G communication interface, a 4G/LTE communication interface, and a 5G communication interface, but is not limited thereto.

Delivery of information in accordance with various embodiments herein may be performed through the communication interface 4030. Operators of the online game may connect to the server 4000 using an additional device. The operators may use a program for communicating with the server 4000. For example, the operators may communicate with the server 4000 through a web browser, and the server 4000 may request the operators to authenticate their identities.

Figure 9:
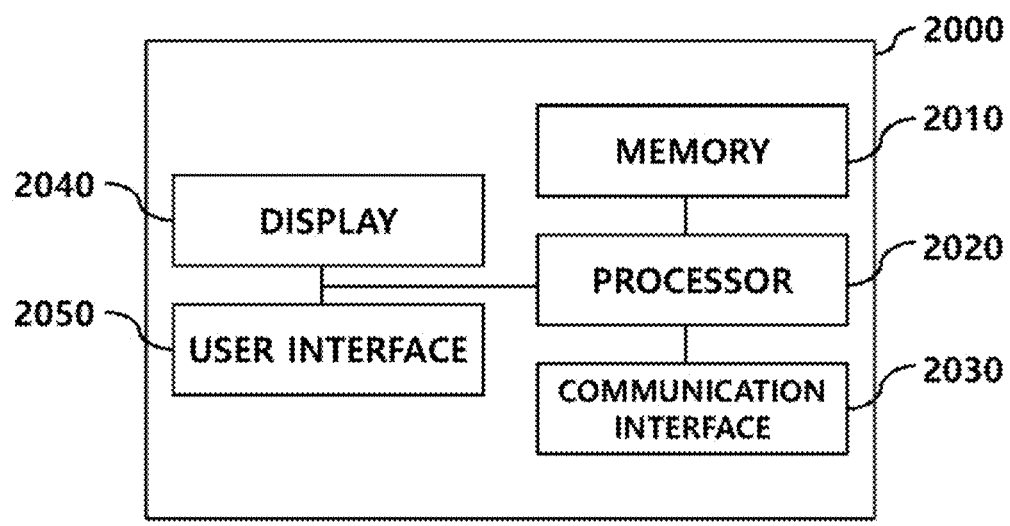
FIG. 9 is a block diagram of a terminal according to an embodiment.

FIG. 9 is a block diagram of a terminal according to an embodiment.

As shown in FIG. 9, the terminal 2000 may include a memory 2010, a processor 2040, a communication interface 2050, and a display 2040, and an input interface 2050. However, all the components shown in FIG. 9 should not be regarded as essential components of the terminal 2000. The terminal 2000 may be implemented by more or fewer components than the components shown in FIG. 9.

Explanation of the memory 2010, the processor 2020 and the communication interface 2030 of the terminal 2000 may refer to the above explanation of the memory 4010, the processor 4020, and the communication interface 4030.

The memory 2010 may store instructions that enable the terminal 2000 to perform various operations in accordance with embodiments herein. In an embodiment, the memory 2010 may store a game and data related thereto.

The processor 2020 may be configured to execute instructions stored in memory 2010 to cause the terminal 2000 to perform various operations in accordance with various embodiments herein. In an embodiment, the processor 2020 may execute the game stored in the memory 2010 and may retrieve data related to the game.

Delivery of information in accordance with various embodiments herein may be performed through the communication interface 2030.

The display 2040 is a component that visualizes information processed by the processor 2020. The information displayed by the processor 2020 may be visualized on the display 2040. The display 2040 may include at least one from among a liquid crystal display, a thin-film transistor-liquid crystal display, an organic light-emitting diode, a flexible display, a 3D display, and an electrophoretic display. the display may also function as an input interface 2050 when the display and the touchpad are integrated together to form a touch screen, The input interface 2050 is a component designed to allow a user using the terminal 2000 to interact with the terminal 2000. For example, the input interface 2050 may be a key pad, a dome switch, a touch pad (e.g., contact electrostatic capacitive type, pressure resistive film type, infrared detection type, surface acoustic wave propagation type, integral strain gauge type, piezo-effect type, etc.), a jog wheel, or a jog switch, but is not limited thereto.

The apparatus described above may be implemented as a hardware component, a software component, and/or a combination of hardware components and software components. For example, apparatuses, devices, and components described herein may be implemented using a processor, a controller, an arithmetic logic unit (ALU), a digital signal processor, a microcomputer, a field programmable gate array (FPGA), a programmable logic unit (PLU), a microprocessor, a general purpose computer, a special purpose computer system, or any other device capable of executing instructions. A processing device, such as a processor, may execute an operating system (OS) and one or more software applications running on the OS. The processing device may also access, store, manipulate, process, and generate data in response to execution of the software. For ease of understanding, the processing device is described as singular, but those skilled in the art may recognize that the processing device may include a plurality of processing elements and/or a plurality of types of processing elements. For example, the processing device may include a plurality of processors or one or more processors and one or more controllers. The processing device may have other processing configurations, such as a parallel processor.

Software may include a computer program, a code, an instruction, or a combination thereof, and may be configured to configure the processing device and/or command the processing device independently or collectively. Software and/or data may be embodied in a machine, a component, a physical device, virtual equipment, a computer storage media or device, a transmitted signal wave permanently or temporarily, in order to be interpreted by the processing device or to provide the processing device with instructions or data. Software and/or data may be distributed over a networked computer system and stored or executed in a distributed manner. Software and/or data may be stored on one or more computer readable recording media configured for execution by one or more processors. The one or more computer readable recording media may be included in a computer program product. Software and/or data may be stored in a computer program product configured for execution by one or more processors.

The method according to an embodiment may be implemented in a form of program instructions that can be executed by various computing devices and recorded in a computer readable medium. The computer readable medium may include program instructions, data files, data structures, or a combination thereof. The program instructions recorded on the medium may be specially designed and constructed for embodiments. Examples of the computer readable media include magnetic media such as hard disks, floppy disks and magnetic tapes; optical media such as CD-ROMs and DVDs; magneto-optical media such as floptical disks, and hardware devices such as ROM, RAM, flash memory, and the like which are specifically configured to store instructions. Examples of the program instructions may include machine language codes produced by a compiler, and high-level programming language code that can be executed by a computer using an interpreter or the like. The hardware devices described above may be configured to operate by one or more software modules to perform operations of embodiments, and vice versa.

While embodiments are explained with reference to exemplary embodiments and accompanying drawings, those who skilled in the art may modify and change the embodiments from the disclosure. For example, the techniques described may be performed in a different order than the described methods, and/or the described systems, structures, devices, circuits, or any components may be integrated or combined in a different form than the described methods, or may be replaced by their equivalents, in order to achieve substantially same or similar results.

Therefore, other implementations, other embodiments, and equivalents to following claims are also within the scope the claims.

What is claimed is:

1. A game providing method:
   displaying a game interface comprising a plurality of blocks;
   detecting a first user interaction on a first block among the plurality of blocks;
   specifying the first block as a trigger block in response to the first user interaction;
   detecting a second user interaction on a second block adjacent to the first block; and
   performing, based on a characteristic of the second user interaction, either one of switching positions between the first block and the second block, and specifying the second block as the trigger block,
   wherein the second block is specified as the trigger block when a holding time of the second user interaction is longer than a predetermined time length or the second user interaction is a drag input that starts from the second user interaction,
   wherein the positions between the first block and the second block are switched when a holding time of the second user interaction is shorter than the predetermined time length, wherein the trigger block is a block which is able to switch its position with an adjacent block.

2. The game providing method of claim 1, wherein the second block is adjacent to the first block, and located on a left, right, upper, or lower side of the first block.

3. The game providing method of claim 1, wherein the predetermined time length is equal to 0.4 second.

4. The game providing method of claim 1, wherein the performing comprises performing, based on whether the second user interaction is the drag input, either one of switching positions between the first block and the second block, and specifying the second block as the trigger block.

5. The game providing method of claim 4, wherein when the drag input starts from the first user interaction, a position of the first block is switched with a position of the second block.

6. The game providing method of claim 1, wherein a position of the second block is switched with a position of a third block which is adjacent to the second block in a direction identified by the drag input.

7. The game providing method of claim 1, wherein the performing comprises performing, based on whether the second user interaction is extended from the first user interaction, either one of switching positions between the first block and the second block, and specifying the second block as the trigger block.

8. The game providing method of claim 7, wherein when the second user interaction is extended from the first user interaction, positions between the first block and the second block are switched.

9. The game providing method of claim 7, wherein
the performing comprises: when the second user interaction is not extended from the first user interaction, performing, based on a holding time of the second user interaction, either one of switching positions between the first block and the second block, and specifying the second block as the trigger block.

10. The game providing method of claim 9, wherein
the second block is specified as the trigger block when the second user interaction is detected longer than a predetermined time length or the second user interaction is extended from the game interface over a predetermined range.

11. The game providing method of claim 1, wherein
the method may further include: when the switching is performed, determining whether the first block or the second block satisfies a predetermined condition; and
undoing the switching when the first block and the second block do not satisfy the predetermined condition.

12. The game providing method of claim 11, wherein
the predetermined condition comprises at least one of a first condition where the first block is arranged in a line with at least two first adjacent blocks of same appearances to the first block, and a second condition where the second block is arranged in a line with at least two second adjacent blocks of same appearances to the second block.

13. The game providing method of claim 12, wherein
removing the first block and the first adjacent blocks and substituting the removed first block and the removed first adjacent blocks with at least three blocks when the first condition is satisfied, and
removing the second block and the second adjacent blocks and substituting the removed second block and the removed second adjacent blocks with at least three blocks when the second condition is satisfied.

14. The game providing method of claim 13, wherein
when the first condition or the second condition is satisfied, an appearance of the first block and an appearance of the second block are different.

15. The game providing method of claim 13, wherein
when the first condition or the second condition is satisfied, appearances of the first adjacent blocks and appearances of the second adjacent blocks are different.

16. A non-transitory computer readable medium storing instructions which, when executed, cause at least one processor to carry out the game providing method of claim 1.

17. A game providing apparatus, comprising:
a memory storing instructions; and
at least one processor configured to execute the instructions to:
display a game interface comprising a plurality of blocks;
detect a first user interaction on a first block among the plurality of blocks;
specify the first block as a trigger block in response to the first user interaction;
detect a second user interaction on a second block adjacent to the first block; and
perform, based on a characteristic of the second user interaction, either one of switching positions between the first block and the second block, and specifying the second block as the trigger block,
wherein the second block is specified as the trigger block when a holding time of the second user interaction is longer than a predetermined time length or the second user interaction is a drag input that starts from the second user interaction,
wherein the positions between the first block and the second block are switched when a holding time of the second user interaction is shorter than the predetermined time length,
wherein the trigger block is a block which is able to switch its position with an adjacent block.

* * * * *